(12) United States Patent
Roh et al.

(10) Patent No.: US 9,276,270 B2
(45) Date of Patent: Mar. 1, 2016

(54) PREPARING AN ALLOY CATALYST USING CONDUCTIVE POLYMER COATING

(75) Inventors: Bum Wook Roh, Gyeonggi-do (KR); In Chul Hwang, Gyeonggi-do (KR); Han Sung Kim, Seoul (KR); Hyung-Suk Oh, Incheon (KR)

(73) Assignees: Hyundai Motor Company, Seoul (KR); Kia Motors Corporation, Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 552 days.

(21) Appl. No.: 13/109,407

(22) Filed: May 17, 2011

(65) Prior Publication Data

US 2012/0135137 A1　　May 31, 2012

(30) Foreign Application Priority Data

Nov. 26, 2010　(KR) ........................ 10-2010-0119155

(51) Int. Cl.
*B05D 5/12*　　(2006.01)
*H01M 4/92*　　(2006.01)
*B82Y 30/00*　　(2011.01)
*B82Y 40/00*　　(2011.01)

(52) U.S. Cl.
CPC .............. *H01M 4/921* (2013.01); *B82Y 30/00* (2013.01); *B82Y 40/00* (2013.01); *H01M 4/926* (2013.01); *Y02E 60/50* (2013.01)

(58) Field of Classification Search
USPC ........................................................ 427/115
See application file for complete search history.

(56) References Cited

U.S. PATENT DOCUMENTS 5,876,867 A * 3/1999 Itoh et al. ...................... 429/524
(Continued)

FOREIGN PATENT DOCUMENTS

| KR | 10-0723385 | 3/2007 |
| KR | 10-2007-0039239 | 4/2007 |

(Continued)

OTHER PUBLICATIONS

Simmons et al. "Noncovalent Functionalization as an Alternative to Oxidative Acid Treatment of Single Wall Carbon Nanotubes with Applications for Polymer Composites", Mar. 31, 2009.*

*Primary Examiner* — Austin Murata
(74) *Attorney, Agent, or Firm* — Mintz Levin Cohn Ferris Glovsky and Popeo, P.C.; Peter F. Corless (57) ABSTRACT

Techniques herein prepare an alloy catalyst using a protective conductive polymer coating. More particularly, an alloy catalyst is prepared by: preparing a platinum catalyst supported on carbon; coating the surface of the platinum catalyst with a conductive polymer; supporting a transition metal salt on the coated catalyst; and heat treating the catalyst on which the transition metal salt is supported. Also, an alloy catalyst may be prepared by: preparing a platinum-transition metal catalyst supported on carbon; coating the surface of the platinum-transition metal catalyst with a conductive polymer; and heat treating the coated catalyst. Accordingly an alloy catalyst with superior dispersity can be prepared by increasing the degree of alloying of the catalyst through heat treatment while preventing the increase of catalyst particle size through carbonization of the conductive polymer. The prepared catalyst may be useful, for example, for a fuel cell electrode.

7 Claims, 9 Drawing Sheets

(56) References Cited

U.S. PATENT DOCUMENTS

2007/0059585 A1* 3/2007 Yoo et al. .................. 429/44
2009/0246601 A1* 10/2009 Iwata et al. ................ 429/40
2011/0177938 A1* 7/2011 Scheab et al. ............. 502/185

FOREIGN PATENT DOCUMENTS

| KR | 10-0728611 | | 5/2007 |
| KR | 10-2008-0024706 | | 3/2008 |
| WO | WO 2010/026046 | * | 3/2010 |

* cited by examiner

PREPARING AN ALLOY CATALYST USING CONDUCTIVE POLYMER COATING

CROSS-REFERENCE TO RELATED APPLICATIONS

This application claims priority under 35 U.S.C. §119 to Korean Patent Application No. 10-2010-0119155, filed on Nov. 26, 2010, in the Korean Intellectual Property Office, the disclosure of which is incorporated herein by reference in its entirety.

BACKGROUND (a) Technical Field

The present invention relates to a method for preparing a high-activity alloy catalyst for a fuel cell having a large active area by coating a carbon-supported platinum or platinum-transition metal catalyst with a conductive polymer such as polypyrrole (PPy) as a capping agent and performing heat treatment, thus increasing the degree of alloying and catalytic activity while preventing growth of particle size.

(b) Background Art

Fuel cells which convert chemical energy resulting from oxidation of fuel directly into electrical energy are spotlighted as a next-generation energy source. In particular, research for commercialization has been actively carried out in the auto industry for the purposes of improvement of fuel efficiency, reduction of emissions, environmental protection, or the like. In particular, extensive research has been focused on the catalysts for oxidation and reduction occurring on the electrodes of the fuel cells.

For commercialization of the polymer electrolyte membrane fuel cell (PEMFC), performance, cost, and durability issues have to be solved, all of which are closely related to the fuel cell catalyst. Since the PEMFC operates at low temperature, a precious metal such as platinum is used as a catalyst in order to increase the slow rate of oxygen reduction. However, the high cost and limited reserves of platinum delay its commercialization. For a fuel cell vehicle to be commercially viable, it is reported that the use of platinum should be reduced below 0.2 g per kW. However, theoretically, voltage loss occurs as the supporting amount of platinum decreases (e.g., to 0.4 $mg/cm^2$ or lower). Thus, there is a limitation on reducing the use of platinum in the platinum catalyst. Further, since the slow oxygen reduction leads to over-voltage in the cathode, alloy catalysts are studied to improve the reaction rate.

As an alloy catalyst for a fuel cell, $Pt_3M$ of an oriented face-centered cubic structure with M being a transition metal (e.g., Ti, V, Cr, Fe, Co, Ni, etc.) is studied actively. Carbon-supported $Pt_3M$ is typically prepared by depositing a metal precursor on a commercially available carbon-supported platinum catalyst and carrying out heat treatment. Usually, after adding a transition metal precursor to the carbon-supported platinum catalyst, heat treatment is carried out at 700-1200° C. using a gaseous reducing agent such as hydrogen. Although the heat treatment improves catalytic activity by increasing the degree of alloying, it is accompanied by increased particle size and decreased dispersity.

Accordingly, methods for preparing alloy catalysts without the heat treatment process are studied. For example, certain previous methods to prepare alloy catalysts below 200° C. used carbonyl complexes (e.g., as described by Hui et al. in *J. Phys. Chem.* 108 (2004) 11024-11034), while other previous methods used the microemulsion method (e.g., as described by Xiong et al. in *Electrochim. Acta* 50 (2005) 2323-2329). However, the general colloid method is difficult in control of the degree of alloying and the transition metal easily dissolves out under the fuel cell environment since its concentration on the surface is high. One additional method, such as that described by Watanabe et al. in *Appl. Mater. Interfaces* 2 (2010) 888-895, succeeded in preparing small alloy particles with desired composition by using nanocapsules. One drawback to this method, however, is that it is not easy to remove the oleic acid and oleylamine used to create the capsules and, as a result, they lead to reduced catalytic activity. As such, since the currently available methods for preparing alloy catalysts at low temperatures have many problems, heat treatment at high temperature is unavoidable.

SUMMARY

The present invention coats a conductive polymer such as polypyrrole (PPy) or polyaniline (PANI) on a platinum or platinum-transition metal catalyst supported on carbon in order to prevent growth of catalyst particles and then performed heat treatment at high temperature. As a result, carbonization of the conductive polymer during the heat treatment inhibited growth of the metal catalyst particles and led to formation of face-centered cubic alloy of platinum and the transition metal, resulting in increased platinum concentration on the catalyst surface and reduced dissolving out of the transition metal. Accordingly, the present invention is directed to providing a method for preparing an alloy catalyst with increased degree of alloying and restricted particle growth, by introducing a conductive polymer such as PPy or PANI as a capping agent and carrying out heat treatment at high temperature.

In one general aspect, the present invention provides a method for preparing an alloy catalyst including: preparing a platinum catalyst supported on carbon; coating the surface of the platinum catalyst with a conductive polymer; supporting a transition metal salt on the coated catalyst; and heat treating the catalyst on which the transition metal salt is supported.

In another general aspect, the present invention provides a method for preparing an alloy catalyst including: preparing a platinum-transition metal catalyst supported on carbon; coating the surface of the platinum-transition metal catalyst with a conductive polymer; and heat treating the coated catalyst.

The above and other aspects and features of the present invention will be described further herein.

BRIEF DESCRIPTION OF THE DRAWINGS

The above and other objects, features and advantages of the present invention will now be described in detail with reference to certain exemplary embodiments thereof illustrated in the accompanying drawings which are given hereinbelow by way of illustration only, and thus are not limitative of the disclosure, and wherein.

It should be understood that the appended drawings are not necessarily to scale, presenting a somewhat simplified representation of various preferred features illustrative of the basic principles of the disclosure. The specific design features of the disclosure as disclosed herein, including, for example, specific dimensions, orientations, locations and shapes, will be determined in part by the particular intended application and use environment.

DETAILED DESCRIPTION

Hereinafter, reference will now be made in detail to various embodiments of the present invention, examples of which are illustrated in the accompanying drawings and described below. While the disclosure will be described in conjunction with exemplary embodiments, it will be understood that the present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

The present invention relates to preparation of an alloy catalyst by coating the surface of a platinum or platinum-transition metal catalyst supported on carbon with a conductive polymer and carrying out heat treatment, thus increasing the degree of alloying, preventing growth of catalyst particle size through carbonization of the conductive polymer, and providing superior dispersity.

The platinum alloy catalyst may be prepared in two ways. Platinum and a transition metal may be reduced simultaneously and then heat treated. Alternatively, platinum may be reduced first and, after impregnating a transition metal salt later, it may be reduced by heat treatment (precursor deposition). When metals of several species need to be reduced at once, a very strong reducing agent is required. $NaBH_4$ is usually used. However, use of such a strong reducing agent is problematic in that the control of metal particle size is difficult, the degree of alloying decreases due to difference in reducing rate of the metals, and the concentration of the transition metal on the catalyst surface tends to be high. Due to low equilibrium potential, the transition metals on the surface are easily dissolved under the fuel cell operation environment, leading to decreased fuel cell performance. If the degree of alloying of the alloy catalyst is increased, the concentration of the transition metal on the catalyst surface decreases, resulting in improved durability as well as catalytic activity. In order to increase the degree of alloying of the alloy catalyst, a heat treatment process has to be accompanied. However, heat treatment at high temperature leads to decreased active area due to increased particle size. Thus, in the present invention, a conductive polymer is introduced as a capping agent in order to increase the degree of alloying of the catalyst by heat treatment while preventing particle size increase.

For example, Korean Patent No. 10-0728611 proposes a catalyst prepared by coating a conductive polymer on a carbon support, distributing platinum and a transition metal on the coated film and carrying out heat treatment. That is to say, in the above patent, the conductive polymer is coated on the support and then the active substances are introduced on the conductive polymer. In contrast, in the present invention, a platinum or platinum-transition metal catalyst supported on a catalyst is coated with a conductive polymer and then heat treatment is carried out. As a result, the conductive polymer is carbonized, thus preventing the growth of catalyst particles enclosed therein while allowing the formation of the face-centered cubic structure of platinum and the transition metal. Accordingly, the present invention is quite different from the above patent in the technological background, preparation process, role of the conductive polymer, and so forth.

The present invention provides a method for preparing an alloy catalyst comprising: preparing a platinum catalyst supported on carbon; coating the surface of the platinum catalyst with a conductive polymer; supporting a transition metal salt on the coated catalyst; and heat treating the catalyst on which the transition metal salt is supported.

Figure 1:
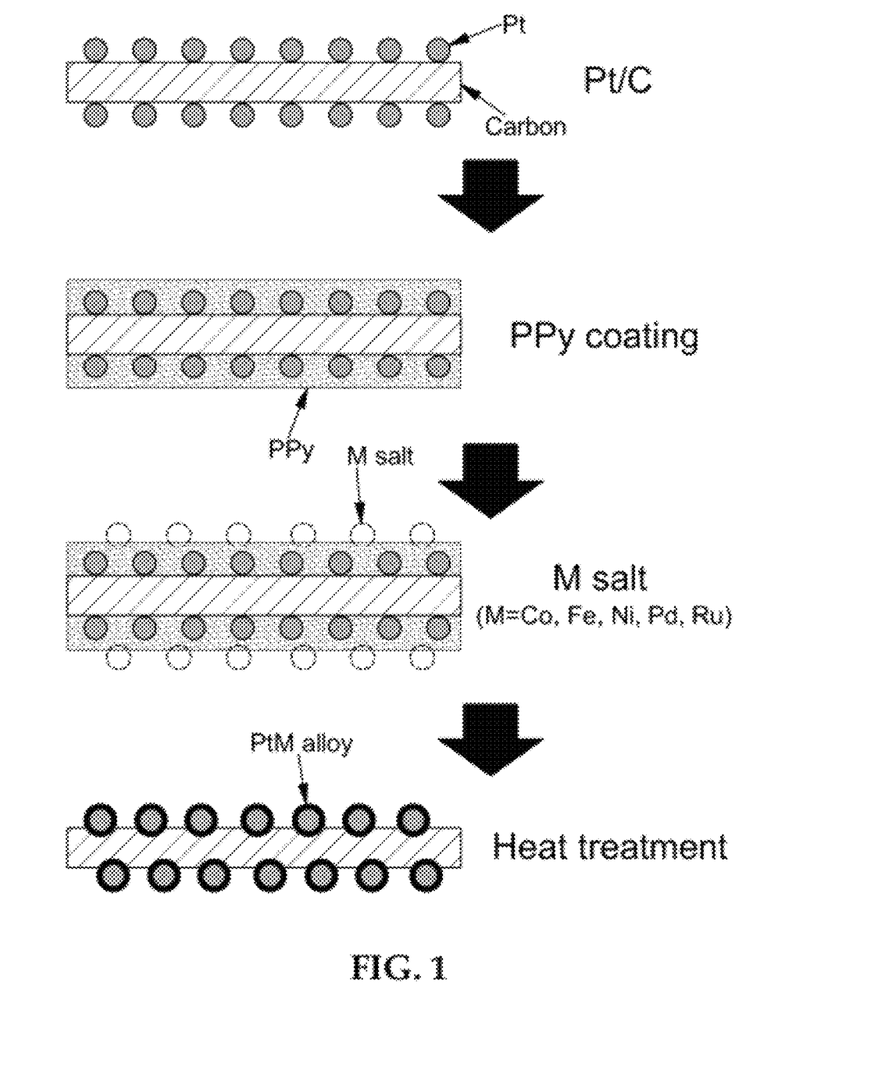
FIG. 1 schematically illustrates a procedure of preparing an alloy catalyst by coating polypyrrole (PPy) on a carbon-supported platinum catalyst as a capping agent and then depositing a precursor.

First, as shown in FIG. 1, a platinum catalyst supported on carbon is prepared. The method of supporting of platinum on carbon is not particularly limited. Such known methods as chemical reduction using a reducing agent, alcohol reduction, polyol method, or the like may be used. The carbon support may be one or more selected from commonly used carbon black, carbon nanotube, carbon nanofiber, carbon nanocoil and carbon nanocage.

Figure 3:
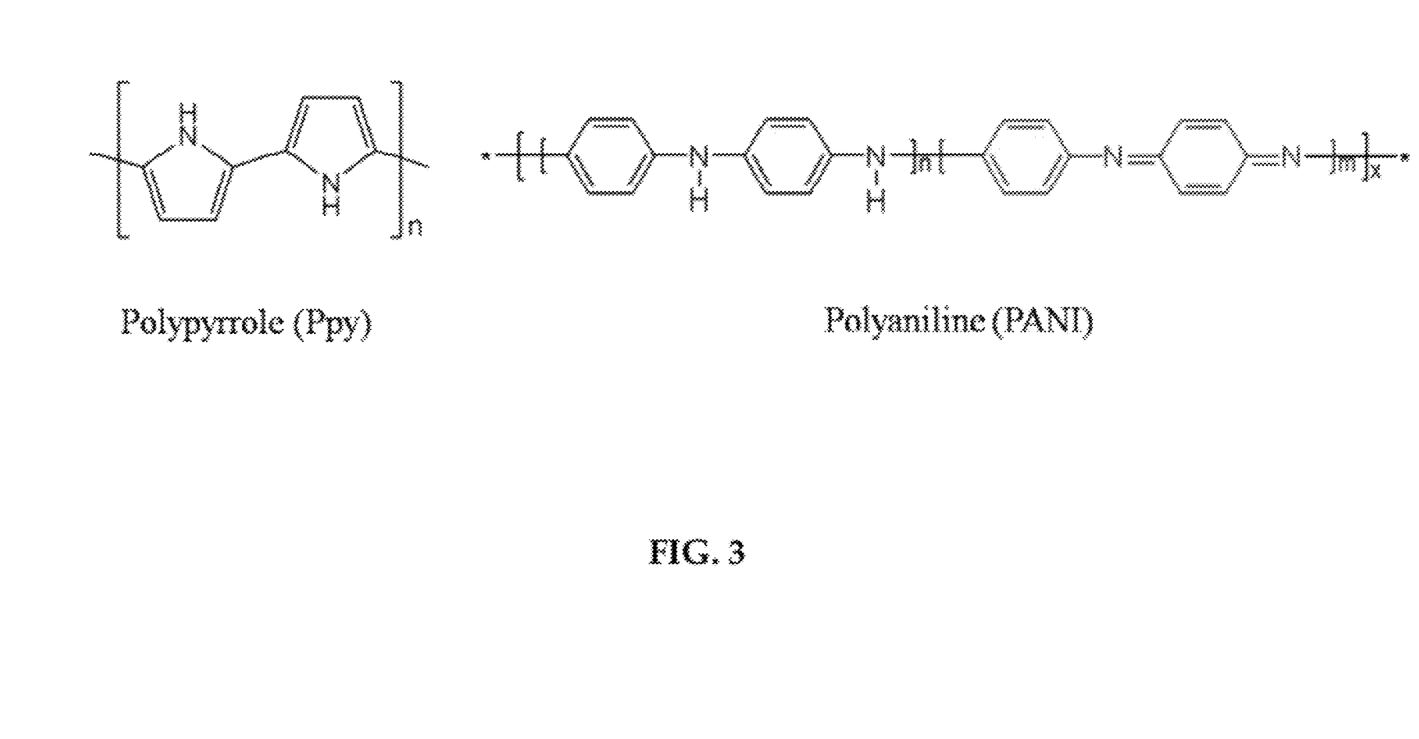
FIG. 3 shows molecular structures of PPy and polyaniline (PANI) that can be used as capping agent.

Then, the surface of the platinum catalyst is coated with a conductive polymer. The conductive polymer may be polypyrrole (PPy) or polyaniline (PANI), the structures of which are shown in FIG. 3. The conductive polymer may be coated by immersing the platinum catalyst in an organic solvent such as ethanol, adding a monomer of the conductive polymer thereto, and polymerizing the monomer at 4° C. in the presence of an oxidizing agent. Specifically, the monomer of the conductive polymer may be pyrrole. After the coating is completed, the catalyst having the surface coated with the conductive polymer may be obtained after washing and drying.

Then, a transition metal salt is supported on the coated catalyst. The transition metal may be cobalt, iron, nickel, palladium, ruthenium, titanium, vanadium or chromium, and the transition metal salt may be one or more selected from nitrate, sulfate, acetate, chloride and oxide of the metals. After adding the transition metal salt together with the coated catalyst to an organic solvent such as ethanol and refluxing at 80° C., the organic solvent may be evaporated to obtain the catalyst with the transition metal salt supported.

Finally, the catalyst with the transition metal salt supported is heat treated to obtain an alloy catalyst. The heat treatment is performed at 700-1000° C. under argon or argon/hydrogen mixture atmosphere. If the heat treatment temperature is below 700° C., the degree of alloying of the catalyst may be low, leading to unsatisfactory activity. And, if the temperature exceeds 1000° C., although the degree of alloying increases, the catalytic activity may decrease due to increased particle size. Hence, the aforesaid range is preferred.

If necessary, the heat-treated catalyst may be refluxed in an aqueous solution of a strong acid to remove impurities.

Figure 2:
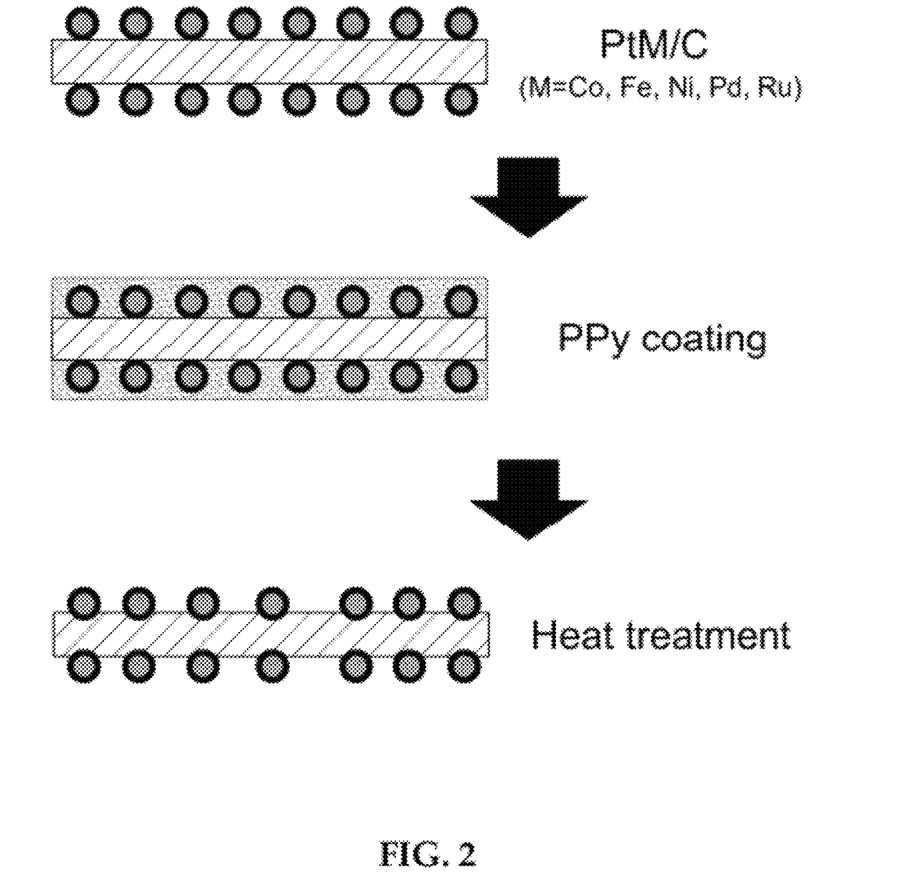
FIG. 2 schematically illustrates a procedure of preparing an alloy catalyst by coating PPy on a carbon-supported platinum-transition metal catalyst as a capping agent wherein $NaBH_4$ reduction is used.

The present invention further provides a method for preparing an alloy catalyst comprising, as shown in FIG. 2: preparing a platinum-transition metal catalyst supported on carbon; coating the surface of the platinum-transition metal catalyst with a conductive polymer; and heat treating the coated catalyst.

Alternatively from the above-described method, platinum and a transition metal are supported on carbon first, and heat treatment is carried out after coating with a conductive polymer. In general, a stronger reducing agent is needed to support platinum and the transition metal at once on carbon by reducing them and the control of particle size is difficult. However, if the platinum-transition metal catalyst can be prepared with small and uniform particle size, by coating with the conductive polymer and then carrying out the heat treatment, the degree of alloying can be improved while preventing the increase of catalyst particle size. Details about the transition metal, the conductive polymer and the heat treatment condition may be the same as those of the above-described method, wherein the platinum catalyst is coated with the conductive polymer and then the transition metal salt is supported.

According to the method for preparing an alloy catalyst of the present invention, an alloy catalyst with superior dispersity can be prepared by increasing the degree of alloying of the catalyst while preventing the increase of catalyst particle size. The prepared catalyst may be useful, for example, for a fuel cell electrode.

EXAMPLES

Illustrative examples and experiments will now be described. The following examples and experiments are for illustrative purposes only and not intended to limit the scope of this disclosure.

Example 1

Preparation of Alloy Catalyst Using Platinum Catalyst Supported on CNF

1-Pyrenecarboxylic acid (1-PCA, 250 mg) was stirred in ethanol (400 mL) for 30 minutes. Herringbone-type carbon nanofiber (CNF, 500 mg) was added to the 1-PCA solution and stirred for 6 hours. Then, CNF doped with 1-PCA was recovered through filtration under reduced pressure. 1-PCA was introduced to CNF in order to form π-π interaction between pyrene and graphene of CNF. The 1-PCA-doped CNF has a hydrophilic surface and allows easy supporting of platinum. The 1-PCA-doped CNF (140 mg) was added to ethylene glycol (25 mL) and stirred for 10 minutes. Then, after adding NaOH (100 mg), the mixture was further stirred for 10 minutes. The concentration of NaOH was 0.1 M. NaOH serves to adjust pH for control of the platinum particle size. Subsequently, after adding $PtCl_4$ (150 mg) and stirring for about 10 minutes, the mixture was refluxed at 160° C. for 3 hours. Then, platinum ions are reduced and adsorbed on the surface of CNF. In order to further increase the supporting ratio, after stirring at room temperature for 12 hours, the solution was further stirred for 24 hours after lowering pH to 1-2. The resulting solution was filtered under reduced pressure and washed several times with ultrapure water. The recovered catalyst was dried at 160° C. for 1 hour to remove impurities.

The prepared catalyst was stirred in ethanol (20 mL) and then stirred at 4° C. for 1 hour after adding pyrrole (130 mg). Thereafter, an aqueous solution (17.6 mL) of the oxidizing agent ammonium persulfate (228 mg) prepared by dissolving in water (100 mL) was added and stirring was carried out at 4° C. for 24 hours. Then, pyrrole is polymerized to polypyrrole (PPy). After completion of the polymerization, the resulting catalyst was recovered by filtration under reduced pressure, washed sufficiently with water and ethanol, and dried in a vacuum oven at 40° C. for 12 hours. A PPy-coated platinum catalyst supported on CNF was obtained.

$Co(NO_3)_2 \cdot 6H_2O$ (43 mg) and ethylenediamine (40.4 mg) were sufficiently stirred in ethanol. Then, the coated catalyst prepared above was added to the solution and refluxed at 80° C. for 3 hours. Upon completion of the refluxing, the solvent was evaporated using an evaporator to support the transition metal salt on the catalyst.

The catalyst with the transition metal salt supported was heat treated in a furnace at 800° C. for 1 hour, under argon 90 vol %/hydrogen 10 vol % atmosphere. Upon completion of the heat treatment, the catalyst was recovered by cooling to room temperature. Then, after refluxing in 0.5 M sulfuric acid at 80° C. for 3 hours in order to remove impurities, followed by washing and drying, an alloy catalyst was obtained.

Example 2

Preparation of Alloy Catalyst Using Platinum Catalyst Supported on CNC

An alloy catalyst was prepared in a manner similar to Example 1, except for using carbon nanocage (CNC) instead of CNF and carrying out heat treatment at 900° C.

Example 3

Preparation of Alloy Catalyst Using Platinum-Cobalt Catalyst Supported on CNF

A platinum-cobalt catalyst was prepared using CNF as a support. CNF (130 mg) was stirred in ultrapure water (25 mL) for 10 minutes. Then, after adding $PtCl_4$ (150 mg) and $CoCl_2$ (19.3 mg), the mixture was stirred for 10 minutes. An aqueous solution of $NaBH_4$ prepared by dissolving $NaBH_4$ (224.7 mg) in ultrapure water (25 mL) was used as a reducing agent. Upon completion of reduction, the platinum-cobalt catalyst supported on CNF was recovered by filtration under reduced pressure, washed several times with ultrapure water, and dried at 160° C. for 1 hour.

The prepared platinum-cobalt catalyst was coated with PPy and heat treated in the same manner as Example 1 to obtain an alloy catalyst.

Comparative Example 1

Preparation of Alloy Catalyst Using Platinum Catalyst Supported on CNF

An alloy catalyst was prepared in the same manner as Example 1, without coating with PPy.

Comparative Example 2

Preparation of Alloy Catalyst Using Platinum Catalyst Supported on CNC

An alloy catalyst was prepared in the same manner as Example 2, without coating with PPy.

Comparative Example 3

Preparation of Alloy Catalyst Using Platinum-Cobalt Catalyst Supported on CNF An alloy catalyst was prepared in the same manner as Example 3, without coating with PPy.

X-Ray Diffraction Pattern Analysis

Figure 4:
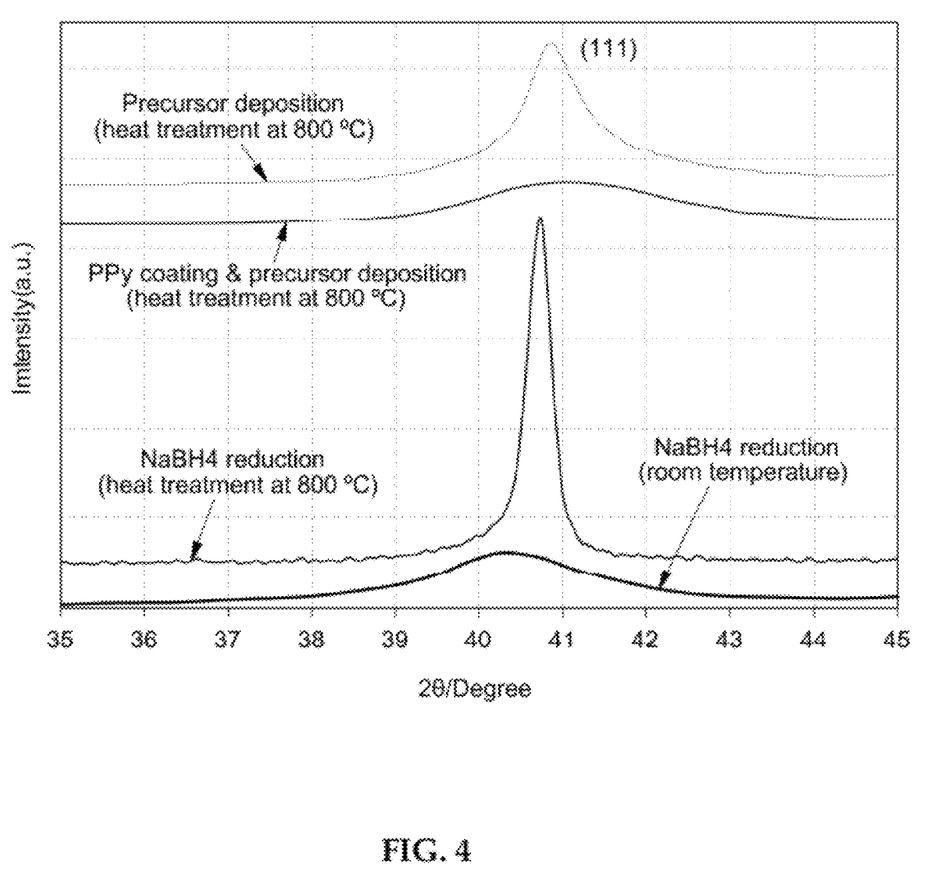
FIG. 4 shows X-ray diffraction pattern images of carbon-supported platinum-cobalt alloy ($Pt_3Co_1/C$) catalysts prepared by $NaBH_4$ reduction at room temperature, $NaBH_4$ reduction followed by heat treatment at 800° C., precursor deposition, or precursor deposition after coating with PPy as a capping agent.

X-ray diffraction patterns of carbon-supported platinum-cobalt alloy ($Pt_3Co_1/C$) catalysts prepared by $NaBH_4$ reduction at room temperature, $NaBH_4$ reduction followed by heat treatment at 800° C. (Comparative Example 3), precursor deposition (Comparative Example 1), and precursor deposition using PPy as a capping agent (Example 1) are shown in FIG. 4. The analysis result is summarized in Table 1.

TABLE 1

| $Pt_3Co_1/C$ catalyst prepared by | 2θ shift (°) relative to commercially available Pt/C catalyst | Particle size (nm) |
|---|---|---|
| $NaBH_4$ reduction (room temperature) | +0.9 | 3.2 |
| $NaBH_4$ reduction (heat treatment at 800° C., Comparative Example 3) | +1.2 | 21.8 |
| Precursor deposition (heat treatment at 800° C., Comparative Example 1) | +1.3 | 8.5 |
| Precursor deposition using PPy (heat treatment at 800° C., Example 1) | +1.4 | 3.8 |

When a strong reducing agent is used to prepare a platinum alloy catalyst, the control of metal particle size is difficult and the concentration of the transition metal on the catalyst surface increases due to the difference in reducing rate of the metals. The transition metal on the surface is easily dissolved under the fuel cell operation environment, leading to decreased fuel cell performance. Accordingly, heat treatment at high temperature has to be accompanied to decrease the concentration of the transition metal on the catalyst surface. However, the heat treatment at high temperature leads to decreased active area due to increased particle size. Therefore, introduction of a conductive polymer as a capping agent is necessary to increase the degree of alloying of the catalyst by heat treatment while preventing particle size increase.

Platinum particle size was calculated for the Pt (111) peaks at 2θ=40° using the Scherrer formula. The $Pt_3Co_1/C$ catalyst prepared by $NaBH_4$ reduction at room temperature had a particle size of 3.2 nm, which increased to 21.8 nm when the catalyst was heat treated at 800° C. (Comparative Example 3). The degree of alloying was determined from the shift of the Pt (111) peaks. More rightward shift relative to the XRD peak of the general carbon-supported platinum catalyst is translated into a higher degree of alloying. The $Pt_3Co_1/C$ catalyst prepared by $NaBH_4$ reduction at room temperature showed a rightward 2θ shift of 0.9° as compared to the general Pt/C catalyst, and the $Pt_3Co_1/C$ catalyst prepared by $NaBH_4$ reduction followed by heat treatment at 800° C. (Comparative Example 3) exhibited a rightward 2θ shift of 1.2°. This reveals that the $Pt_3Co_1/C$ catalyst prepared by $NaBH_4$ reduction at room temperature has a low degree of alloying and requires heat treatment. If the degree of alloying is low, the concentration of the transition metal on the surface increases. Although the degree of alloying is increased by heat treatment, the particle size is also increased. The increase of the catalyst particle size results in decreased active area of the catalyst. When the $Pt_3Co_1/C$ catalyst was prepared by precursor deposition, i.e., by reducing platinum on carbon, supporting the transition metal precursor and then carrying out heat treatment (Comparative Example 1), the particle size was 8.5 nm. When the $Pt_3Co_1/C$ catalyst was prepared by precursor deposition using PPy as the capping agent (Example 1), the particle size was 3.5 nm. The catalyst prepared by precursor deposition showed a rightward 2θ shift of 1.3°, and the catalyst prepared by precursor deposition using PPy as the capping agent showed a rightward 2θ shift of 1.4°. That is to say, the catalyst of Example 1 had a smaller particle size and a higher degree of alloying than the catalyst of Comparative Example 1. Thus, it was confirmed that precursor deposition using PPy as the capping agent can increase the degree of alloying while preventing the increase of particle size.

Figure 5:
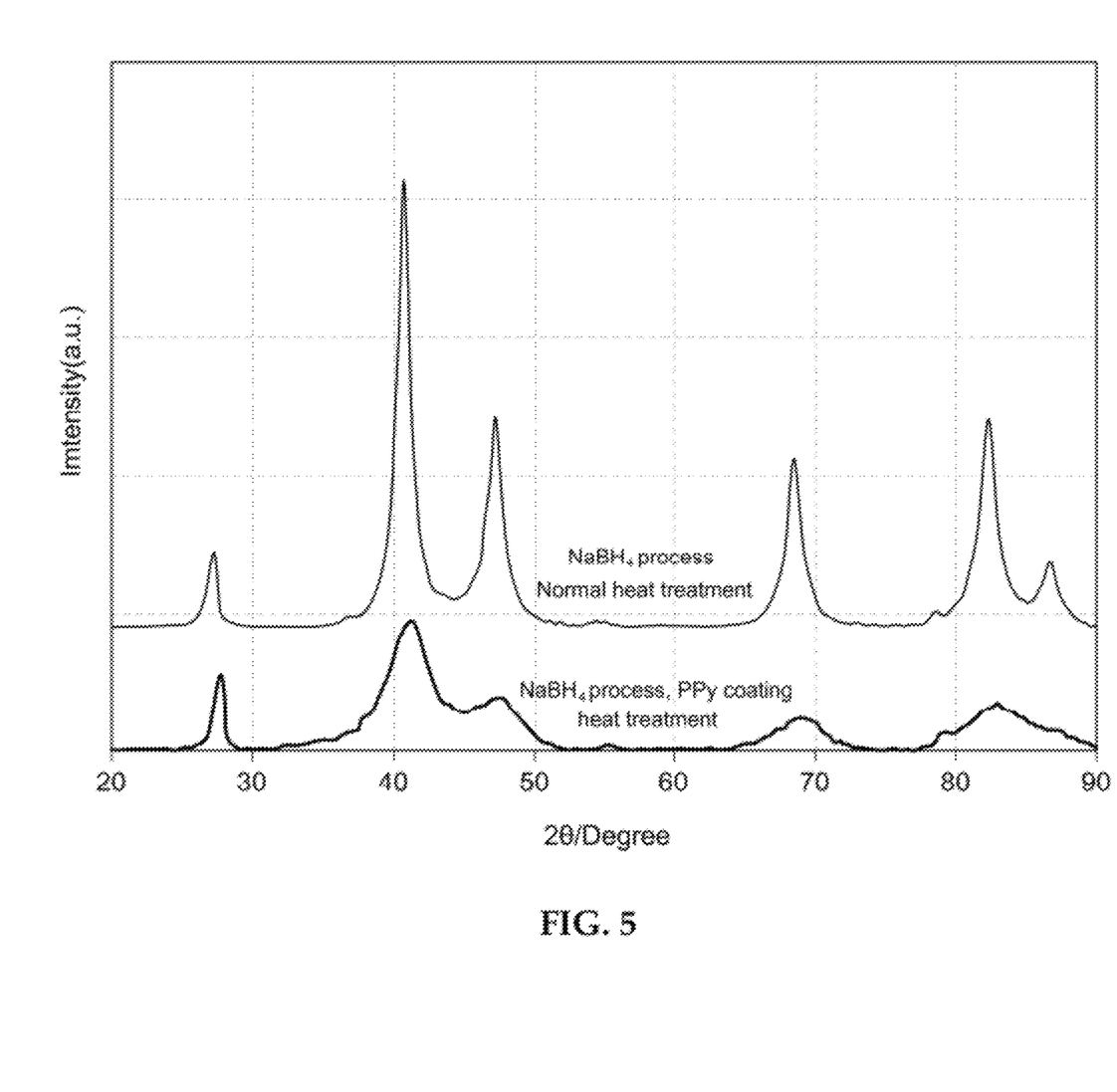
FIG. 5 shows X-ray diffraction pattern images of carbon-supported platinum-cobalt alloy ($Pt_3Co_1/C$) catalysts prepared by $NaBH_4$ reduction followed by heat treatment with or without coating with PPy as a capping agent.

X-ray diffraction patterns of the carbon-supported platinum-cobalt alloy ($Pt_3Co_1/C$) catalysts prepared by $NaBH_4$ reduction followed by heat treatment using PPy as the capping agent (Example 3) or without using PPy (Comparative Example 3) are shown in FIG. 5.

The $Pt_3Co_1/C$ catalyst prepared using PPy as the capping agent (Example 3) had a particle size of 3.7 nm, whereas the $Pt_3Co_1/C$ catalyst prepared without using PPy (Comparative Example 3) had a particle size of 21.8 nm. This confirms that use of PPy as the capping agent in the preparation of the alloy catalyst is also useful in $NaBH_4$ reduction as well as in precursor deposition.

Inductively Coupled Plasma (ICP) Analysis

ICP analysis was carried out for the carbon-supported platinum-cobalt alloy ($Pt_3Co_1/C$) catalysts prepared by $NaBH_4$ reduction at room temperature, $NaBH_4$ reduction followed by heat treatment at 800° C. (Comparative Example 3), precursor deposition (Comparative Example 1), and precursor deposition using PPy as a capping agent (Example 1). The result is summarized in Table 2.

TABLE 2

| $Pt_3Co_1/C$ catalyst prepared by | ICP Pt (wt %) | ICP Co (wt %) | Atomic ratio (Pt:Co) |
|---|---|---|---|
| $NaBH_4$ reduction (room temperature) | 44.3 | 4.2 | 3.2:1 |
| $NaBH_4$ reduction (heat treatment at 800° C., Comparative Example 3) | 46.8 | 4.6 | 3.1:1 |
| Precursor deposition (heat treatment at 800° C., Comparative Example 1) | 46.7 | 4.5 | 3.1:1 |
| Precursor deposition using PPy (heat treatment at 800° C., Example 1) | 45.6 | 4.6 | 2.9:1 |

When $NaBH_4$ reduction was carried out at room temperature, the Pt:Co ratio was 3.2:1, with higher Pt than the desired Pt:Co ratio of 3:1, as cobalt dissolved out on the catalyst surface during acid treatment. In contrast, in the other three catalysts which were heat treated, the dissolution of Co into the acid solution was less than the $NaBH_4$ reduction at room temperature. This result suggests that the proportion of platinum increased on the catalyst surface whereas that of cobalt increased at the catalyst core during the heat treatment. Considering that a fuel cell is operated under an acidic condition, heat treatment is necessarily required to increase the proportion of platinum on the surface of the alloy catalyst. Accordingly, use of PPy as the capping agent in precursor deposition is effective as the strategy to increase the proportion of platinum on the surface of the alloy catalyst while preventing the increase of particle size.

High Resolution Transmission Electron Microscopic (HR-TEM) Analysis

Figure 6:
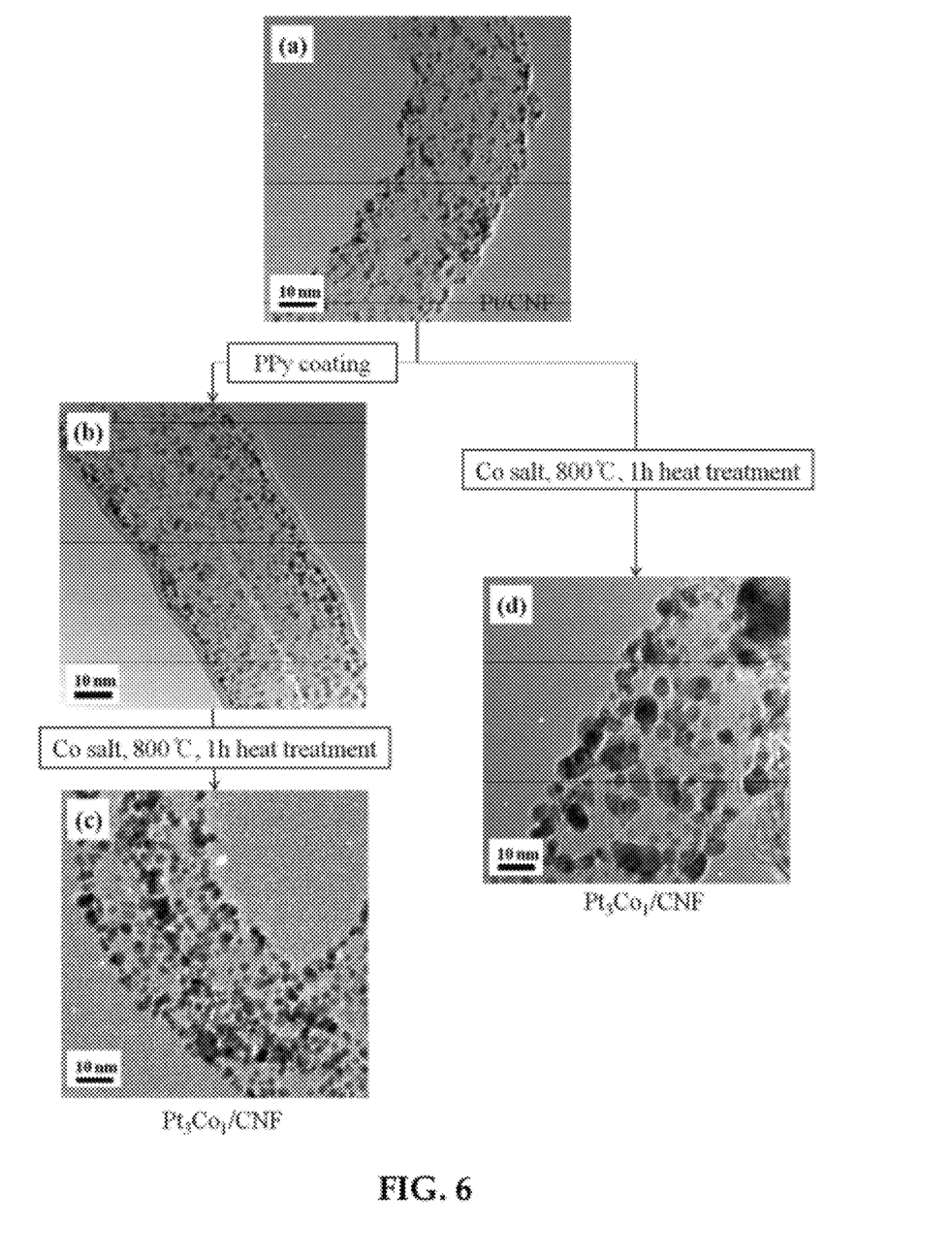
FIG. 6 shows high resolution transmission electron microscopic (HR-TEM) images of platinum-cobalt alloy catalysts ($Pt_3Co_1/CNF$) supported on carbon nanofiber (CNF) prepared by heat treatment with or without coating with PPy.

FIG. 6 shows HR-TEM images of the platinum-cobalt alloy catalysts ($Pt_3Co_1$/CNF) supported on CNF prepared by precursor deposition followed by heat treatment using PPy (Example 1) or without using PPy (Comparative Example 1). (a) shows the Pt/CNF catalyst before heat treatment, (b) shows the PPy-coated Pt/CNF catalyst, (c) shows the catalyst of (b) after supporting of cobalt salt and heat treatment for 1 hour at 800° C. under argon 90 vol %/hydrogen 10 vol % atmosphere (Example 1), and (d) shows the catalyst of (a) after supporting of cobalt salt and heat treatment for 1 hour at 800° C. under argon 90 vol %/hydrogen 10 vol % atmosphere (Comparative Example 1).

Platinum particle size was 2 nm in (a), which increased to 3-12 nm in (d) after heat treatment. It can also be seen that the dispersity of platinum became worse. When PPy was used as the capping agent, it can be seen that PPy was coated on Pt/CNF with a thickness of 2 nm in (b). It can be seen in (c) that the platinum-cobalt alloy maintained a small particle size of 3.5 nm and high dispersity after the heat treatment at 800° C.

Figure 7:
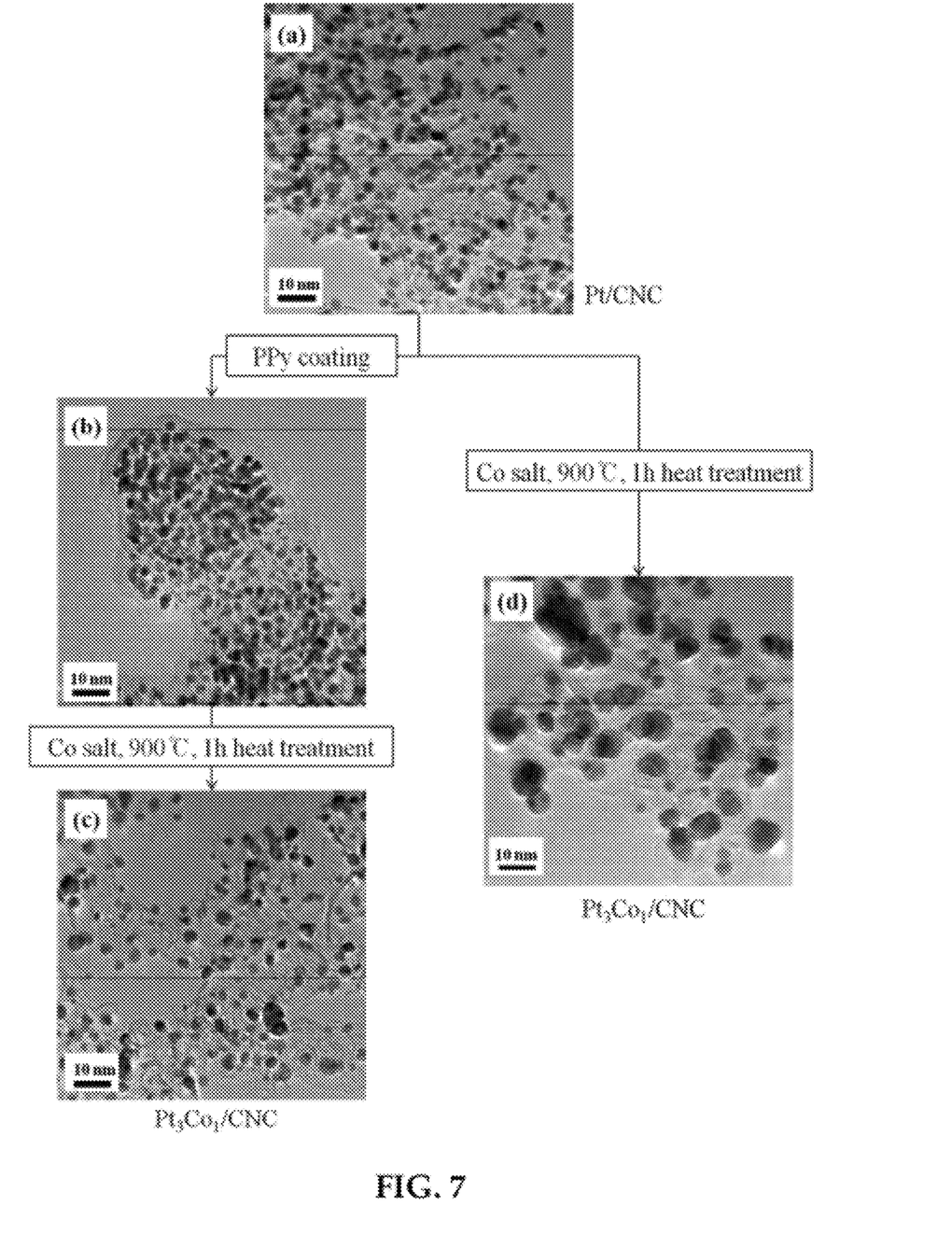
FIG. 7 shows HR-TEM images of platinum-cobalt alloy catalysts ($Pt_3Co_1/CNC$) supported on carbon nanocage (CNC) prepared by heat treatment with or without coating with PPy.

FIG. 7 shows HR-TEM images of the platinum-cobalt alloy catalysts ($Pt_3Co_1$/CNC) supported on CNC prepared by precursor deposition followed by heat treatment using PPy (Example 2) or without using PPy (Comparative Example 2). (a) shows the Pt/CNC catalyst before heat treatment, (b) shows the PPy-coated Pt/CNC catalyst, (c) shows the catalyst of (b) after supporting of cobalt salt and heat treatment for 1 hour at 900° C. under argon 90 vol %/hydrogen 10 vol % atmosphere (Example 2), and (d) shows the catalyst of (a) after supporting of cobalt salt and heat treatment for 1 hour at 900° C. under argon 90 vol %/hydrogen 10 vol % atmosphere (Comparative Example 2).

Platinum particle size was 3.7 nm in (a), which increased to 5-15 nm in (d) after heat treatment. It can also be seen that the dispersity of platinum became worse. When PPy was used as the capping agent, it can be seen that PPy was coated on Pt/CNC with a thickness of 3 nm in (b). It can be seen in (c) that the platinum-cobalt alloy maintained a small particle size of 5.0 nm and high dispersity.

Cyclic voltammetry (CV) test and evaluation of oxygen performance of unit cell CV test was carried out for the platinum-cobalt alloy catalyst ($Pt_3Co_1$/CNC) supported on CNC prepared by heat treatment using PPy (Example 2) or without using PPy (Comparative Example 2) and a commercially available carbon-supported platinum-cobalt alloy catalyst (50 wt % $Pt_3Co_1$/C, Tanaka Kikinzoku Kogyo).

Also, unit cell oxygen performance was tested for the catalysts. The anode was prepared with a commercially available Pt/C catalyst, at 0.4 mg/cm$^2$ on the basis of platinum, and the cathode was prepared with each catalyst, at 0.4 mg/cm$^2$ on the basis of the metal. Hydrogen (150 ccm) and oxygen (150 ccm) were supplied to the anode and the cathode, respectively, under normal pressure. The unit cell was operated at 75° C. and performance was evaluated by current density measured at 0.6 V.

Figure 8:
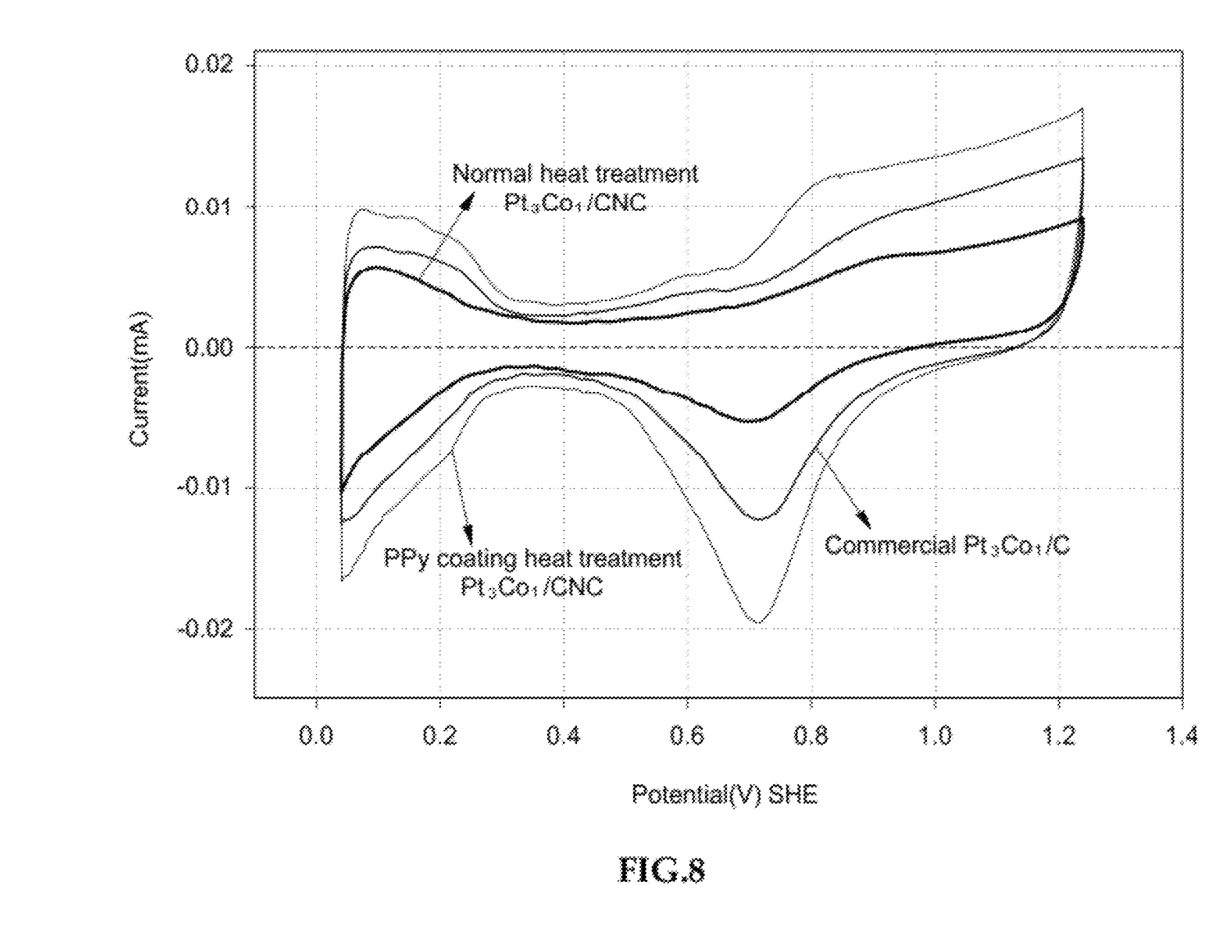
FIG. 8 compares current-voltage (CV) characteristics of platinum-cobalt alloy catalysts ($Pt_3Co_1/CNC$) supported on CNC prepared by heat treatment with or without coating with PPy and a commercially available carbon-supported platinum-cobalt alloy catalyst.
Figure 9:
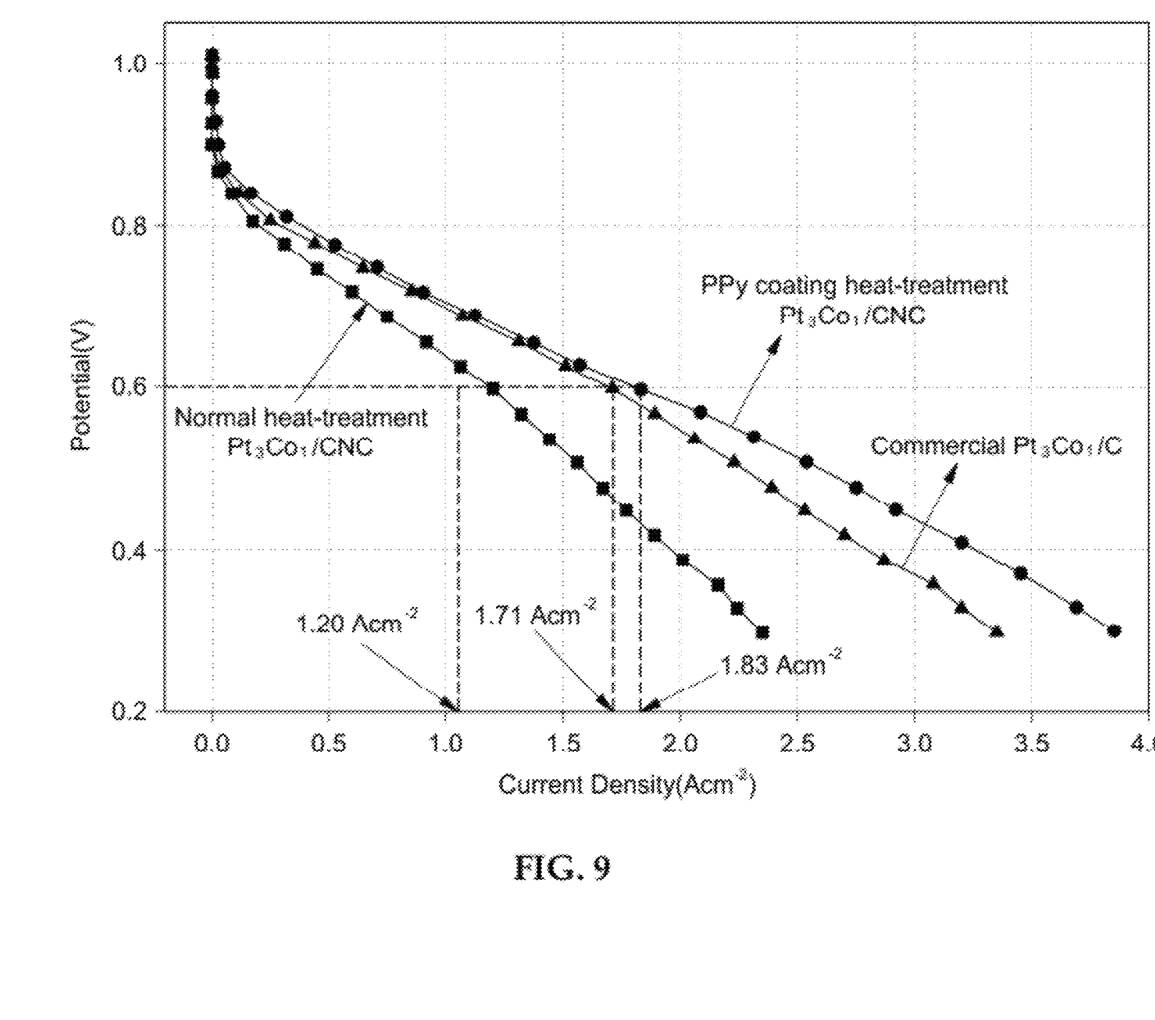
FIG. 9 compares oxygen performance of platinum-cobalt alloy catalysts ($Pt_3Co_1/CNC$) supported on CNC prepared by heat treatment with or without coating with PPy and a commercially available carbon-supported platinum-cobalt alloy catalyst.

The result is shown in FIGS. 8-9 and Table 3.

TABLE 3

| | Active surface area in CV (m$^2$/g) | Current density @ 0.6 V (A/cm$^2$) |
|---|---|---|
| Commercially available $Pt_3Co_1$/C | 31.8 | 1.71 |
| $Pt_3Co_1$/CNC (precursor deposition using PPy, heat treatment at 900° C., Example 2) | 41.5 | 1.83 |
| $Pt_3Co_1$/CNC (precursor deposition, heat treatment at 900° C., Comparative Example 2) | 20.8 | 1.20 |

The active surface area of the catalyst measured by the CV test was 41.5 m$^2$/g for the $Pt_3Co_1$/CNC catalyst prepared using PPy as the capping agent (Example 2), larger than 20.8 m$^2$/g of the $Pt_3Co_1$/CNC catalyst prepared by normal heat treatment (Comparative Example 2) or 31.8 m$^2$/g of the commercially available $Pt_3Co_1$/C catalyst. This suggests that use of PPy as the capping agent increased the degree of alloying through heat treatment at high temperature while preventing the increase of particle size and maintaining uniform dispersity.

In the unit cell oxygen performance test, the $Pt_3Co_1$/CNC catalyst prepared using PPy as the capping agent (Example 2) showed a current density of 1.83 A/cm$^2$ at 0.6 V, whereas the $Pt_3Co_1$/CNC catalyst prepared by normal heat treatment (Comparative Example 2) exhibited 1.20 A/cm$^2$. The commercially available $Pt_3Co_1$/C catalyst showed a current density of 1.71 A/cm$^2$ at 0.6 V. This result coincides with the active surface area measurement by CV. The use of PPy as the capping agent increased the degree of alloying through heat treatment at high temperature while preventing the increase of particle size, and thus increased the catalytic activity.

According to the method for preparing an alloy catalyst of the present invention, an alloy catalyst with superior dispersity can be prepared by increasing the degree of alloying of the catalyst through heat treatment while preventing the increase of catalyst particle size through carbonization of the conductive polymer. The prepared catalyst may be useful, for example, for a fuel cell electrode.

The present invention has been described in detail with reference to specific embodiments thereof. However, it will be appreciated by those skilled in the art that various changes and modifications may be made in these embodiments without departing from the principles and spirit of the disclosure, the scope of which is defined in the appended claims and their equivalents.

What is claimed is:

1. A method for preparing an alloy catalyst comprising:
   preparing a platinum catalyst supported on carbon by reducing a platinum ion which is mixed with the carbon that is one or more selected from a group consisting of carbon nanotube, carbon nanofiber, carbon nanocoil and carbon nanocage, wherein the carbon is doped by 1-pyrenecarboxylic acid;
   coating the surface of the platinum catalyst with a conductive polymer;
   supporting a transition metal salt on the coated catalyst; and
   heat treating the catalyst on which the transition metal salt is supported,
   wherein the platinum catalyst is supported on carbon by chemical reduction using a reducing agent, and the heat treatment is performed at a temperature of 700° C.-1000° C. under argon and hydrogen atmosphere, and wherein the conductive polymer is carbonized and removed by the heat treating, and carbonization and removal of the conductive of polymer during the heat treatment lead to formation of face-centered cubic alloy of the platinum catalyst and the transition metal.

2. The method for preparing an alloy catalyst according to claim 1, wherein the conductive polymer is one of either polypyrrole or polyaniline.

3. The method for preparing an alloy catalyst according to claim 1, wherein the transition metal is selected from the group consisting of cobalt, iron, nickel, palladium, ruthenium, titanium, vanadium, and chromium.

4. The method for preparing an alloy catalyst according to claim 1, wherein the transition metal salt is one or more selected from the group consisting of nitrate, sulfate, acetate, chloride and oxide of metals comprising cobalt, iron, nickel, palladium, ruthenium, titanium, vanadium, and chromium.

5. The method for preparing an alloy catalyst according to claim 1, wherein the heat treatment is performed at a temperature within a range of 800-900° C.

6. The method for preparing an alloy catalyst according to claim 1, wherein the alloy catalyst is configured for use as a fuel cell electrode.

7. The method for preparing an alloy catalyst according to claim 1, wherein the heat treatment is performed under argon 90 vol % and hydrogen 10 vol % atmosphere.

* * * * *